(12) United States Patent
Spraggs et al.

(10) Patent No.: US 11,917,056 B1
(45) Date of Patent: Feb. 27, 2024

(54) SYSTEM AND METHOD OF SECURING A SERVER USING ELLIPTIC CURVE CRYPTOGRAPHY

(71) Applicant: SafeMoon US, LLC, Pleasant Grove, PA (US)

(72) Inventors: Lynn Spraggs, Vernon (CA); Robert Spraggs, Coldstream (CA)

(73) Assignee: SafeMoon US, LLC, Pleasant Grove, UT (US)

( * ) Notice: Subject to any disclaimer, the term of this patent is extended or adjusted under 35 U.S.C. 154(b) by 0 days.

(21) Appl. No.: 18/234,196

(22) Filed: Aug. 15, 2023

Related U.S. Application Data

(63) Continuation of application No. 17/993,169, filed on Nov. 23, 2022.

(51) Int. Cl.
*H04L 29/06* (2006.01)
*H04L 9/08* (2006.01)
*H04L 9/30* (2006.01)
*H04L 9/06* (2006.01)

(52) U.S. Cl.
CPC .......... *H04L 9/0869* (2013.01); *H04L 9/0631* (2013.01); *H04L 9/0825* (2013.01); *H04L 9/3066* (2013.01)

(58) Field of Classification Search
CPC ... H04L 9/0861; H04L 9/0869; H04L 9/0825; H04L 9/3066
See application file for complete search history.

(56) References Cited

U.S. PATENT DOCUMENTS

| | | | | |
|---|---|---|---|---|
| 7,190,790 | B1* | 3/2007 | Hill | H04L 9/3006 380/42 |
| 2005/0044405 | A1* | 2/2005 | Spraggs | H04L 63/0236 713/182 |
| 2010/0332574 | A1* | 12/2010 | Herbert | G06F 9/30007 708/250 |
| 2011/0010720 | A1* | 1/2011 | Smith | G06F 21/00 712/E9.016 |
| 2013/0145160 | A1* | 6/2013 | Bursell | G06F 21/6218 713/168 |
| 2014/0016772 | A1* | 1/2014 | Yajima | H04L 9/0816 380/28 |
| 2015/0095648 | A1* | 4/2015 | Nix | H04L 9/0894 713/170 |
| 2019/0268315 | A1* | 8/2019 | Miller | H04L 9/0891 |
| 2021/0218557 | A1* | 7/2021 | Mastenbrook | H04L 9/3263 |

* cited by examiner

*Primary Examiner* — Dao Q Ho
(74) *Attorney, Agent, or Firm* — William Gray Mitchell

(57) ABSTRACT

A system for generating a symmetric key to allow the sharing of information between two entities, wherein the shared information is used to start a server and the symmetric key is established from the private key of a first client and the public key of a second client and for use in a symmetric encryption methodology to encrypt information for transport to the second entity, allowing the second entity to form the same symmetric key to decrypt information with no key transport required.

9 Claims, 2 Drawing Sheets

SYSTEM AND METHOD OF SECURING A SERVER USING ELLIPTIC CURVE CRYPTOGRAPHY

CROSS REFERENCE TO RELATED APPLICATIONS

This application claims priority to U.S. patent application Ser. No. 17/993,169, filed on Nov. 23, 2022.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The disclosure relates to the use of private and public keys for commercial activities. More specifically, the disclosure relates to the use of symmetric keys using Elliptic Curve methodologies for securing critical information.

Background of the Invention

Cloud computing and storage provide users with the capability to store and process their data in third party data centers. The information contained in these data repositories must be protected from being compromised, even from the administrators. Additionally, there are occasions when critical data needs to be stored in a remote location and in a manner that makes the data accessible only to the entity that stored it there.

There are numerous security threats associated with cloud data services. This includes traditional threats and non-traditional threats. Traditional threats include network eavesdropping, illegal invasion, and denial of service attacks. Threats specific to cloud computing also include side channel attacks, virtualization vulnerabilities, and abuse of cloud services. To mitigate these threats, security controls often rely on monitoring the three areas: confidentiality, integrity and access controllability. This disclosure concerns information access controls ("IAC").

IAC means that a data owner can perform the selective restriction of access to their data outsourced to the cloud, whereas third parties not provisioned by the owner cannot access these data. Legal users can be authorized by the owner to access the data, while others cannot access it without permission. IAC can also be referred to as "availability". It is imperative that even privileged uses such as system administrators do not have access to the information. While the administrators can administer the functions necessary to maintain these servers, they must not have access to private information.

Two types of keys are currently used to encrypt and decrypt data shared between users and services providers: asymmetric keys and symmetric keys. Each key is a known type of algorithm, but each type is substantially different in that asymmetric keys are embodied as a private and public key pair whereas, a symmetric key is the same for both encryption and decryption. A private key, in all cases, must be kept secret. Private keys are typically not shared between the sender and receiver of the encrypted sensitive information. Currently, a shared symmetric key is used to encrypt and decrypt the data in systems using public and private keys derived from large prime numbers, such as a Public Key Infrastructure (PKI) type key.

In these PKI systems, one of the keys is used to encrypt the data and the other is used to decrypt the data. Traditionally, the public key is shared and is used to decrypt the data and the private key is kept secret and is used to encrypt the data. The problem is that the amount of data that can be encrypted is limited by the size of the modulus of the two keys, wherein a key modulus is the product of two prime numbers used to generate the key pair. A public key with a modulus of 1024 bits can only encrypt a string which is 16 bytes in length. Thus, the PKI system is used to share a symmetric key which can then be used to encrypt any amount of data. It is obvious that the strength of the system is therefore commensurate with the length of the symmetric key that can be shared. It would be preferable to have a system that produced a larger symmetric key.

If symmetric keys are used, then the keys must be the same for both encryption and decryption. Therefore, to effectively use symmetric keys, it is necessary to securely transport the shared key to another party using the PKI pair. Thus, a lost PKI private key causes many problems, mostly associated with the necessary revocation of the public key. In order to alleviate this issue in web transactions, current protocols require that the public and private keys be used to share a symmetric key between the two parties. An example of sharing symmetric keys is Secure Socket Layer (SSL).

Using shared symmetric keys removes this restriction, but when using symmetric keys, it also becomes necessary to establish a trust relationship between the two parties in order to share the keys. As a general rule, the symmetric keys are shared using a PKI related system. But the PKI system has problems.

The current virtual key methodology solves two problems. First, there is a need for a system allowing parties to exchange data without having to set up a trusted relationship. Second, there is a need for a system to restrict access to private data. The security system disclosed herein will provide an enhanced level of security with respect to traditional cryptographic functionality, and it removes many of the barriers associated with traditional security, including the need for Certificate Authorities and Revocation Lists. The methodology will provide systems with the ability to secure stored operational data in a manner that only can be accessed by the authorized user and will be impervious to traditional forms of breach attempts. In some cases, the information used by the system will be derived from encrypted data stored on the device rather than from stored data on the device.

BRIEF DESCRIPTION OF THE INVENTION

In a preferred embodiment, a system for generating a symmetric key to decrypt data stored on a server and use the decrypted data to initialize a waiting server, such system comprising the following components:

a client device with a processor, an input device, a memory containing a client device application and an optional external storage device;

a server with a processor, a memory and one or more databases containing encrypted secret data; and a crypto package with at least Advanced Encryption Standard (AES) or a similar encryption standard, Secure Hash Algorithm 256-bit (Sha256), Pseudorandom Number Generator (PRNG) and elliptic curve functions, such crypto package stored in each of the client device memory and the server processor memory;

generating, via the processor of the server, a symmetric key to decrypt data stored on a server and use the decrypted data to initialize a waiting server;

when a client enters server credentials, prompting the client device application to generate a pseudo random string using the server credentials and the crypto package, which pseudo random string will be used as a symmetric encryption key to decrypt the encrypted secret data stored in the server database(s) and unlock the server, and the system executes the following steps to accomplish this methodology:

a) sending, via the processor of the client device, a request from the client device to the server requesting permission to unlock server application and the database(s);

b) requesting, via the processor of the client device, the client to input the server credentials into the client device application;

c) using, via the processor of the client device, the server credentials and a pseudo random methodology to generate a random string that can be used as a first symmetric encryption key;

d) generating, via the processor of the client device, a fake client elliptic public key and a fake client elliptic private key, wherein each of the fake client elliptic public key and the fake client elliptic private key is generated using any suitable Random Number Generator (RNG);

e) generating, via the processor of the server, a server temporary elliptic public key and a server temporary elliptic private key, transmitting the server temporary elliptic public key to the client device in response to the request of Step a and storing the server temporary elliptic private key in the server memory;

f) generating, via the processor of the client device, a second symmetric encryption key via the client device processor, wherein the second symmetric encryption key is derived from the fake client elliptic private key and the server temporary elliptic public key;

g) initializing, via the client device processor, an encryption engine with the second symmetric encryption key and using the encryption engine to encrypt the first symmetric encryption key, combining the fake client elliptic public key and the encrypted first symmetric encryption key to create a single string package and sending such single string package from the client device to the server;

h) retrieving, via the processor of the client device, the server temporary elliptic private key from the server memory and the encrypted secret data from the server storage and the fake client elliptic public key from the single string package;

i) generating, via the processor of the client device, a third symmetric encryption key, wherein such third symmetric encryption key is derived from the server temporary elliptic private key and fake client elliptic public key;

j) using, via the processor of the server, the third symmetric encryption key to decrypt the encrypted first symmetric encryption key extracted from the single string package;

k) using, via the processor of the server, the decrypted first symmetric encryption key to decrypt the encrypted secret data on the server;

l) using, via the processor of the server, the server data to decrypt a server master key;

m) storing, via the processor of the server, the decrypted server master key in the server database(s);

n) starting, via the processor of the server, functions that require secret starting data on the server; and o) initiating, via the processor of the server, any related services on the server processor that require secret starting data to be initialized.

In another preferred embodiment, the system for generating a symmetric key as described herein, wherein each symmetric key is 32 bytes in length.

In another preferred embodiment, the system for generating a symmetric key as described herein, wherein the fake client elliptic private key and fake client elliptic public key are a randomly generated elliptic key pair without a relationship to any data.

In another preferred embodiment, the system for generating a symmetric key as described herein, wherein the second symmetric encryption key is constituted from the coordinates of a point on an elliptical curve which is the product of the fake client elliptic private key and the server temporary elliptic public key.

In another preferred embodiment, the system for generating a symmetric key as described herein, wherein the server functions of Step n are taken from the group consisting of custom applications, databases and server key initialization.

In another preferred embodiment, the system for generating a symmetric key as described herein, wherein the fake client public key must lie on the elliptic curve to be valid.

In another preferred embodiment, the system for generating a symmetric key as described herein, wherein the multiplication of Step f is performed by the client crypto package on the client device.

In another preferred embodiment, a system for generating a symmetric key to decrypt data stored on a server and perform work on the server, such system comprising the following components:

a client device with a processor, an input device, a memory and optional external storage device;

a crypto package containing at least each of an encruption engine, Secure Hash Algorithm 256-bit (Sha256), Pseudorandom Number Generator (PRNG) and elliptic curve function on both the server and the client; and a server with a processor and a memory containing one or more databases, such database(s) containing encrypted secret data and the crypto package;

generating, via the processor of the server, a symmetric key to decrypt data stored on a server and perform work on the server;

such system components executing the following steps (lower case letters are in reference to FIG. 2):

1. provisioning the system, which provisioning includes the following sub steps:

a) inputting, via the processor of the client device, a first set of credentials;

b) Generating, via the processor of the client device, phantom credentials, wherein the phantom credentials are pseudo random regenerative credentials using the first set of credentials;
c) Generating, via the processor of the client device, a first symmetric encryption key, embodied as a random string, from the phantom credentials, such that the first symmetric encryption key is regenerative;
d) Inputting, via the input device of the client device, a personal identification number (PIN); e) Encrypting the phantom credentials using the PIN to create a second symmetric encryption key;
f) Storing, via the processor of the client device, the encrypted phantom credentials on the client external storage device;
g) Inputting, via the input device of the client device, user secret data;
h) Initiating, via the processor of the client device, the encryption engine to use the first symmetric encryption key to encrypt the secret data from the client device and send the encrypted secret data to the server memory;
i) Storing, via the processor of the server, the encrypted secret data on the server database; 2. Utilizing the system, which utilizing includes the following sub steps:
j) Inputting, via the input device of the client device, the PIN;
k) Retrieving, via the processor of the client device, the encrypted phantom credentials from the client external storage device into the client device;
l) Decrypting, via the processor of the client device, the phantom credentials using the PIN to create the second symmetric decryption key;
m) Generating, via the processor of the client device, the first symmetric encryption key from the phantom credentials;
n) Sending, via the processor of the client device, a request to the server for an elliptic public key;
o) Generating, via the processor of the client device, a fake client elliptic private key embodied as a random string;
p) Generating via the processor of the client device, a fake client elliptic public key from the fake client elliptic private key;
q) Sending, via the processor of the server, a server temporary elliptic public key to the client device processor;
r) Generating, via the processor of the client device, a third symmetrical encryption key on the client device from the fake client elliptic private key and server temporary elliptic public key;
s) Encrypting, via the processor of the client device, the first symmetric encryption key using the third symmetric encryption key and sending the encrypted first symmetric encryption key and the fake client elliptic public key to the server memory;
t) Extracting, via the processor of the server, the encrypted secret data from the server database and sending the encrypted first symmetric encryption key and the fake client elliptic public key from the client device memory to the server memory;
u) Generating, via the processor of the server, a fourth symmetric encryption key using the server temporary elliptic private key and the fake client elliptic public key;
v) Decrypting, via the processor of the server, the encrypted first symmetric encryption key using the fourth symmetric encryption key as a decryption key, thereby recovering the first symmetric encryption key;
w) Decrypting, via the processor of the server, the encrypted secret data stored on the server database using the first symmetric encryption key as a decryption key; and
x) Performing, via the processor of the server, work using the decrypted secret data.

In another preferred embodiment, the system for generating a symmetric key as described herein, wherein the external storage device is taken from a group consisting of a USB drive or similar memory dongle, smart card, nfc device, an Internet of Things device or an external trusted cloud database.

In another preferred embodiment, the system for generating a symmetric key as described herein, wherein the phantom username and phantom password of Step 1b are pseudo random strings formed from the username and password and cannot be reversed to retrieve the original credentials.

In another preferred embodiment, the system for generating a symmetric key as described herein, wherein the credentials stored on the external device in Step 2l are protected with a PIN, which PIN may be used as an encryption key to encrypt the credentials.

In another preferred embodiment, the system for generating a symmetric key as described herein, wherein the first symmetric encryption key is a 32 byte pseudo random string generated from the first set of credentials.

In another preferred embodiment, the system for generating a symmetric key as described herein, wherein client specific encrypted secret data is stored on the server and such encrypted secret data information can only be accessed with the permission of the client.

In another preferred embodiment, the system for generating a symmetric key as described herein, wherein the client can transfer a key to the server to access the data and perform the work associated with the decrypted secret data.

In another preferred embodiment, the system for generating a symmetric key as described herein, wherein the PIN and external storage device are given to a trusted Notary to authorize the server to perform work.

In another preferred embodiment, the system for generating a symmetric key as described herein, wherein the third and fourth symmetric encryption keys are formed from the product of an integer and an elliptic curve point.

DETAILED DESCRIPTION OF THE INVENTION

Figure 1:
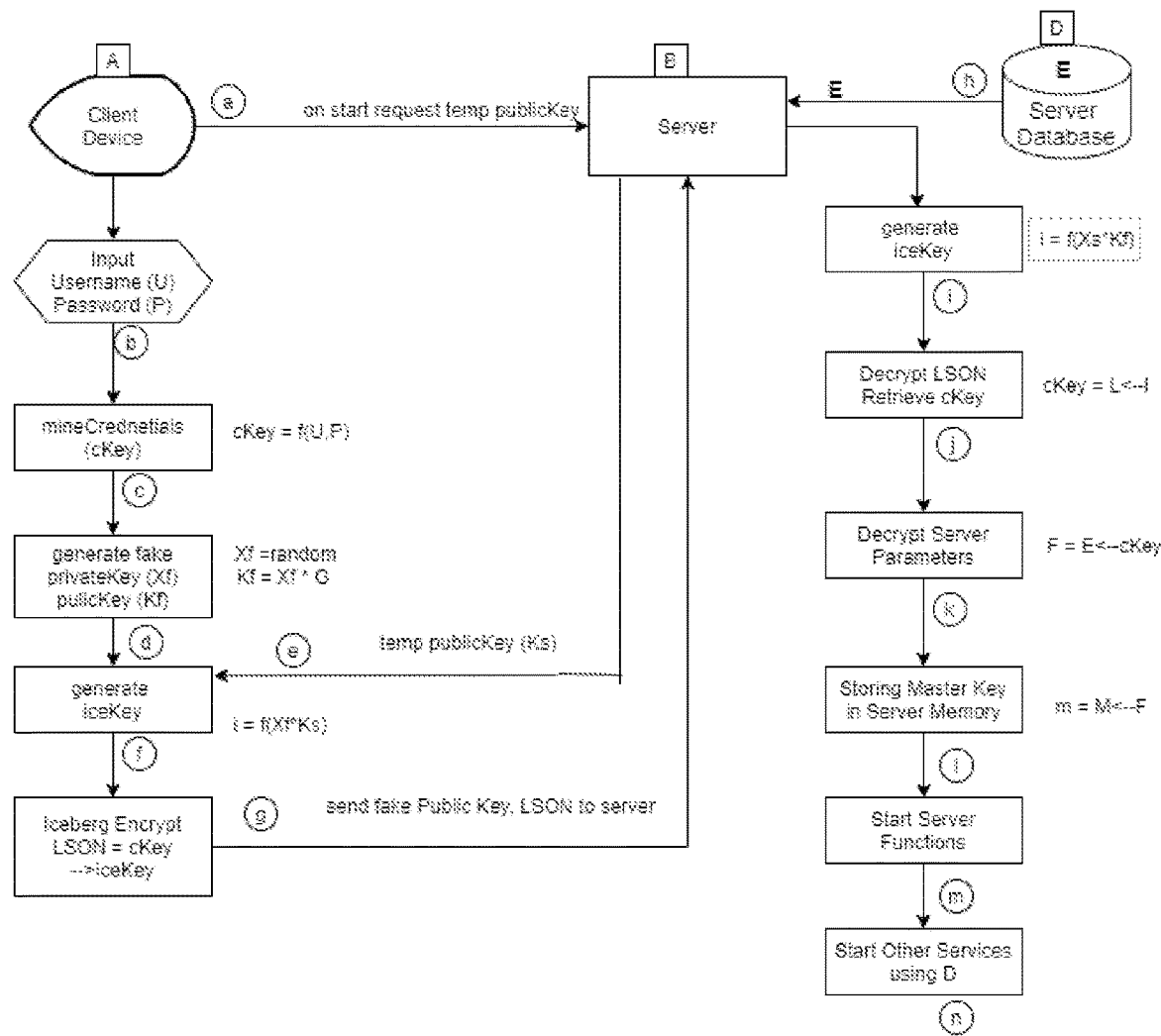
FIG. 1 is a flow chart evidencing steps in the inventive system for generating and using a symmetric key system to enhance the security of a remote server system.

This disclosure relates generally to cryptographic key systems using asymmetric, private and public security keys for commercial activities by providing for replacement of asymmetric key systems with symmetric key systems and elliptic curve systems.

Cryptographic keys may be used to exchange encrypted information in a secure manner. The users often desire to securely exchange the data without the possibility of a third party being able to intercept the data and recover the information. An example is an accounting firm that needs to share encrypted financial information with a client. The institution must first establish a trust relationship with the client then use the established trust relationship to send information securely.

The inventive system includes a feature(s) wherein a user can securely share the encrypted information, for example, to unlock the server. This embodiment relates to the formation and use of a private key from which an elliptic public key can be derived. The system as designed does NOT require the use of any current public key infrastructure, and is rather designed to provide each of a user and an enterprise with identical, symmetric keys. The system is unique and inventive in that the two entities can securely share information without a symmetric key exchange mechanism of any kind.

As generally known, computer cryptography uses integers for keys. In some cases, keys are randomly generated using a random number generator (RNG) or pseudorandom number generator (PRNG). A PRNG is a computer algorithm that produces data that appears random under analysis but which is reproducible given input restrictions.

In public key cryptography, a certificate authority or certification authority (CA) is an entity that stores, signs, and issues digital certificates for asymmetric keys. A digital certificate certifies the ownership of an asymmetric, public key by the named subject of the certificate. This allows others (relying parties) to rely upon signatures or on assertions made about the private key that corresponds to the certified public key. A CA acts as a trusted third party— trusted both by the subject (owner) of the certificate and by the party relying upon the certificate.

An alternative public key private key pair is to use elliptic curves to generate the keys rather than having keys generated using large prime numbers. Unfortunately, the functionality of the two systems is dramatically different and the current work will utilize keys based on elliptic curve technology.

There is a need to be able to store sensitive information with a trusted authority such as a lawyer, wherein the secured data could be accessed in the event of a specific event. Symmetric keys, unlike private/public asymmetric key pairs, are generated by algorithms creating a single shared key without requiring employment of a CA. Symmetric systems also require substantially lower key lengths than public-key algorithms to resist brute-force attacks, and thus are substantially faster to use than asymmetric systems. In the inventive system, the symmetric key is generated directly by an algorithm downloaded to or contained in the client/user's device, thus obviating the need for a CA and the inconvenience of CRLs.

Advanced Encryption Standard (AES) is a specification for the encryption of electronic data established by the National Institute of Standards and Technology. The AES Encryption algorithm (also known as the Rijndael algorithm) is a symmetric block cipher algorithm with a block/chunk size of 128 bits. It converts these individual blocks using keys of 128, 192, and 256 bits. Once it encrypts these blocks, it joins them together to form a ciphertext.

As used herein, the acronym LSON stands for Lynn Spraggs Object Notation which is a methodology used for communication between a client and a server. LSON is a methodology which uses key value pairs concatenated into a single string. The key value pairs are separated with an ascii character, in this case the "1" character is used as the separator. LSON is compact and easy to disassemble. The term "single string package" herein refers to an LSON package or other type of single string comprising combined key value pairs.

As used herein, the term BigInteger means a data type that can accept integer values greater than the standard Integer type which is limited to numbers that fit within the size of word that the computer is using. BigInteger in this context will have 1024 bits compared with 32 bits for current Integers using common CPU's. Additionally, BigInteger also provides operations for modular arithmetic, GCD calculation, primality testing, prime generation, bit manipulation, and a few other miscellaneous operations.

Preferred embodiments of the system are described in the detailed description of FIGS. 1 and 2 below.

The term client is used herein to describe any person or entity using the inventive system. Clients may be individual users, commercial or public service providers or other entities, or any other person or corporate entity using the system. In a primary embodiment, the first client is an individual user and the second client is a corporate entity with whom the first client is sharing encrypted data.

One advantage of the disclosed system is that a user need not negotiate or store a shared secret key or associated piece(s) of confidential information to exchange information securely, since each client can independently generate an identical symmetric key.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept. The invention illustratively disclosed herein suitably may be practiced in the absence of any element which is not specifically disclosed herein.

DETAILED DRAWING DESCRIPTION

FIG. 1 is a schematic drawing evidencing how this methodology can be applied to a client server situation wherein the server needs to decrypt parameters to begin operations. The embodiment is illustrative of the full class of client server communications wherein the admin does not have access to the server.

a. Sending a request from the client device (A) to the server (B) requesting permission to unlock server application and the server database(s) (D);

b. Requesting a client to input the server credentials comprising username (U) and password (P) into the client device (A) application, other credentials could be included and utilized however in this preferred embodiment, the username (U) and the password (P) will be highlighted;

c. On the client device, using the server credentials and a pseudo random methodology to generate a random string that can be used as a first symmetric encryption key (cKey);

d. Generating a fake client elliptic public key (Kf) and a fake client elliptic private key (Xf) embodied as a randomly generated elliptical key pair on the client device, wherein each of the fake client elliptic public key and the fake client elliptic private key is generated by generating a purely random 32 byte random string using any suitable RNG, the fake client elliptic public key is generated using elliptic curve functionality by multiplying an integer consisting of the fake client elliptic private key converted to a BigInteger and an elliptic curve generator point (G) wherein the product of the multiplication is the fake client elliptic public key;

e. Generating a server temporary elliptical key pair consisting of a server temporary elliptic public key (Ks) and a server temporary elliptic private key (Xs) using an algorithm on the server (B), transmitting the server temporary elliptical public key to the client device (A) in response to the request of Step a and storing the server temporary elliptical private key in the server memory;

f. Generating a second symmetric encryption key (I or iceKey) on the client device (A), wherein the second symmetric encryption key is a function of the product of the fake client elliptic private key (Xf) and the server temporary elliptical public key (Ks) (I=f(Xf*Ks)), for example, the function could be the hash of the x and y coordinates of the resulting elliptic curve point;

g. Using the second symmetric encryption key (I or iceKey) on the client device (A) to initialize an instance of an AES or other encryption engine, using the AES or other encryption engine to encrypt the first symmetric encryption key (cKey), sending an LSON package containing the fake client elliptic public key (Kf) and the encrypted first symmetric encryption key from the client device to the server (B), then discarding the fake client elliptic public key, the server temporary elliptic public key and the fake client elliptic private key (Xf) from the client device memory;

h. Retrieving the server temporary elliptic private key (Xs) and the encrypted secret data (E) from the server memory and the fake client elliptic public key (Kf) from the LSON package;

i. On the server (B), generating a third symmetric encryption key (I or iceKey) from as a function of the product of the server temporary elliptic private key (Xs) and fake client elliptic public key (Kf), wherein the generating methodology matches the generating methodology used on the client device (I=f(Xs*Kf));

j. Using the third symmetric encryption key (I or iceKey) on the server (B) to decrypt the encrypted first symmetric encryption key (L) extracted from the LSON package (cKey=L←I);

k. Using the decrypted first symmetric encryption key (cKey) on the server (B) to decrypt the encrypted secretdata (E) on the server and thereby recover the secret data (F) required to unlock the server and initialize the database(s) (F=E← cKey); Secret data (F) could be key value pairs in a flat file, a LSON string or a JSON string for example or any other storage format that would allow the server to parse and utilize the secret data;

l. Using the decrypted secret data (F) to decrypt an encrypted server master key (M) embodied as an encrypted random string previously stored on the server database(s) (m=M←F);

m. Storing the decrypted server master key in the server memory to subsequently be used to encrypt and decrypt data stored in the server database(s) (D);

n. Starting server functions that require secret starting data using the secret data (F), for example, providing the credentials to initiate the server databases; and o. Initiating any related services on the server (B) that require secret starting data (F) to be initialized.

NOTE: there is a required previous step wherein a trusted administrator uses an app or program to enter a username (U) and Password (P) and uses these data to form a symmetric key to encrypt critical secret data that is then stored on the server. This U and P are the same data that the first client enters in Step b above.

Figure 2:
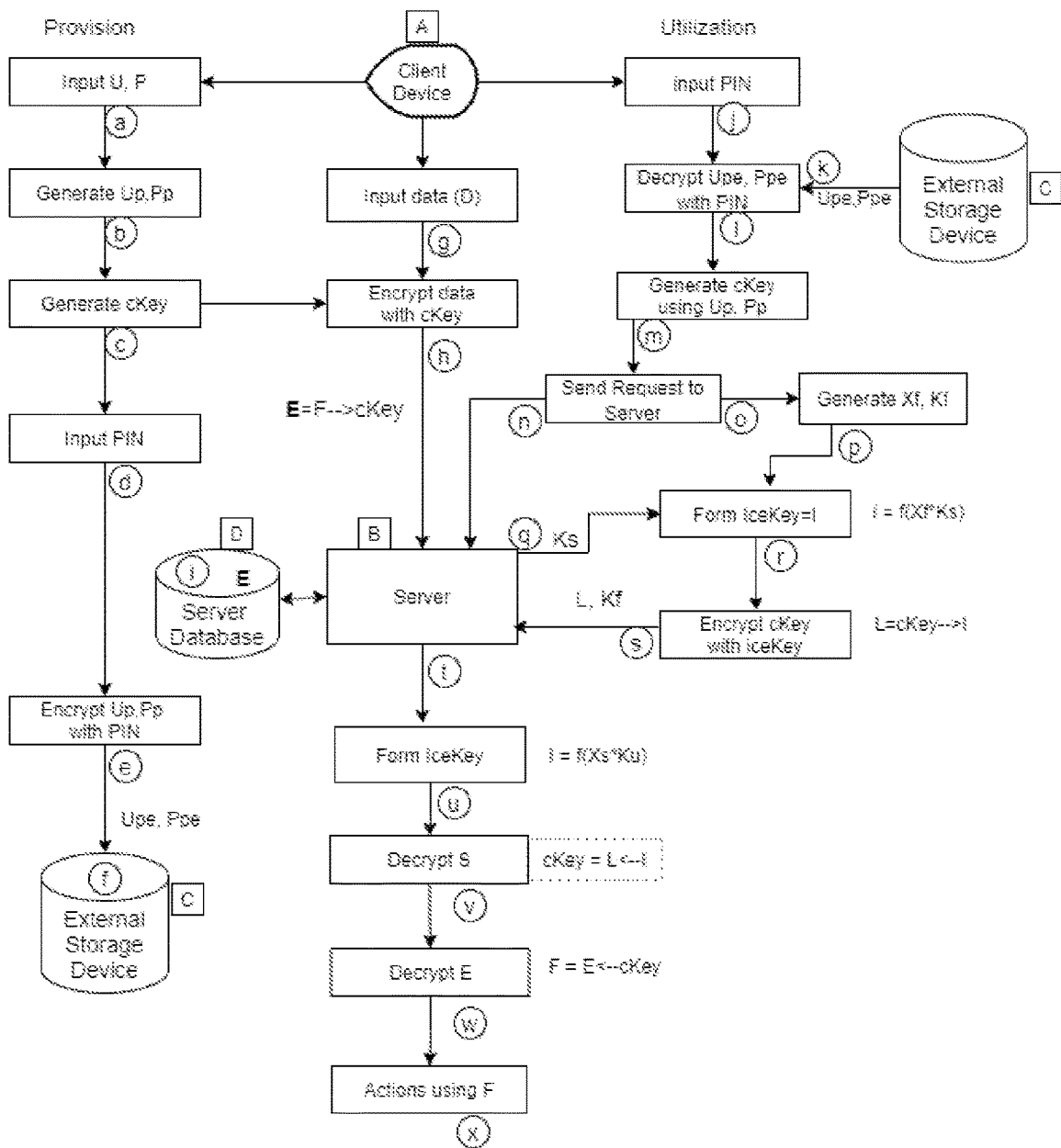
FIG. 2 is a flow chart evidencing an alternate system for generating and using a symmetric key to decrypt data stored on a server and perform work on the server.

FIG. 2 is a schematic drawing evidencing an alternate embodiment wherein the methodology of FIG. 1 can be applied to a client-server or client-client situation wherein, one client uses a second client or a server to store critical information that might be needed in the future. For example, a client might want to store a Will that could only be decrypted after the client was deceased. A lawyer or notary could hold the encrypted data and the pin and be given the external device to confirm the exact Will that the client intended. In a similar embodiment, the encrypted data could be stored on a blockchain and the pin and the external devices could be held by two different clients. As shown in FIG. 1, lowercase letters in circles track to enumerated method steps.

Step 1. Provisioning the system, which provisioning includes the following sub steps:

a. Inputting a first set of credentials embodied as a username (U) and password (P) into an application on the client device (A);

b. Generating phantom credentials embodied as a phantom username (Up) and phantom password (Pp) on the client device (A), wherein the phantom credentials are pseudo random regenerative credentials using the first set of credentials (U,P) as seed to the PRNG process;

c. Generating a first symmetric encryption key (cKey), embodied as a random string, from the phantom credentials (Up,Pp), such that the first symmetric encryption key is regenerative, using the phantom credentials to seed the PRNG process;

d. Inputting a PIN on the client device (A);

e. Encrypting the phantom credentials (Up,Pp) using the PIN to create a second symmetric encryption key to be used to initialize the AES or other encryption standard instance to obtain encrypted credentials (Upe, Ppe);

f Storing the encrypted phantom credentials (Upe,Ppe) on the client external storage device (C);

g. Inputting secret data (F) onto the client device (A);

h. Initiating the AES or other engine to use the first symmetric encryption key (cKey) to encrypt the secret data (F) from the client device and send the encrypted secret data (E) to the server (B) (E=F→cKey);

i. Store the encrypted secret data (E) on the server database (D); Step 2. Utilizing the system, which utilizing includes the following sub steps:

j. Inputting the PIN on the client device (A);

k. Retrieving the encrypted phantom credentials (Upe, Ppe) from the client external storage device (C) into the client device (A);

l. Decrypting the phantom credentials (Upe,Ppe) using the PIN to create the second symmetric decryption key to get the phantom credentials (Up, Pp);

m. Generating the first symmetric encryption key (cKey) from the phantom credentials (Up,Pp) on the client device (A);

n. Sending a request from the client device (A) to the server (B) for an elliptic public key (Ks)

o. Generating a fake client elliptic private key (Xf) embodied as a random string;
p. Generating a fake client elliptic public key (Kf) from the fake client elliptic private key (Xf);
q. Sending a server temporary elliptic public key (Ks) from the server (B) to the client device (A);
r. Forming a third symmetrical encryption key (I/iceKey) on the client device (A) from the fake client elliptic private key (Xf) and server temporary elliptic public key (Ks) (I=f(Xf*Ks));
s. Encrypting the first symmetric encryption key (cKey) using the third symmetric encryption key (I/iceKey) on the client device (A) and sending the encrypted first symmetric encryption key (L) and the fake client elliptic public key (Kf) to the server (B) (L=cKey→I);
t. Extracting the encrypted secret data (E) from the server database (D) and receiving the encrypted first symmetric encryption key (L) and the fake client elliptic public key (Kf) from the client;
u. Generating a fourth symmetric encryption key (I/iceKey) on the server (B) using the server temporary elliptic private key (Xs) and the fake client elliptic public key (Kf) (I=f(Xs*Kf));
v. Decrypting the encrypted first symmetric encryption key (L) on the server (B) using the fourth symmetric encryption key (I/iceKey) as a decryption key, thereby recovering the first symmetric encryption key (cKey);
w. Decrypting the encrypted secret data (E) stored on the server database (D) using the first symmetric encryption key (cKey) as an AES or other decryption key, thereby recovering the previously input secret data (F); and
x. Performing work on the server (B) using the decrypted secret data (F).

INDEX OF PARTS

A Client device
B Server
C External storage device
D Server storage or database(s)
E Encrypted secret data
F Decrypted secret data
G Elliptic curve generation point
U Username
P Password
Up Phantom credential analogous to U
Upe Encrypted phantom Up
Pp Phantom credential analogous to P
Ppe Encrypted phantom Pp
Xf fake client elliptic private key
Kf fake client elliptic public key
Xs server temporary elliptic private key
Ks server temporary elliptic public key
cKey symmetric encryption key, embodied as a pseudo random generated string using Up, Pp as seed
I/iceKey second/third/fourth symmetric encryption key, each formed from a function of the multiplication of an Integer and a two-dimensional point [I=f (Xi*Kj) where i and j are variables, for example i=s and j=f would give Xs*Kf]
L encrypted first symmetric encryption key
LSON encrypted data bundle (single string package)
M encrypted server master key
m decrypted server master key
→ Symmetric Encryption Symbol in the figures shown as '→'
← Symmetric Decryption Symbol in the figures shown as '←'
* Integer multiplication of a point The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A system comprising the following components:
   a client device with a processor, an input device, a memory and optional external storage device;
   a server with a processor and a memory containing one or more databases, such database(s) containing encrypted secret data and a crypto package;
   the crypto package containing at least each of an encryption engine, Secure Hash Algorithm 256-bit (Sha256), Pseudorandom Number Generator (PRNG) and elliptic curve function on both the server and the client; and
   generating, via the processor of the server, a symmetric key to decrypt data stored on the server and perform work on the server; such system components executing the following steps (lower case letters are in reference to FIG. 2):
   1. provisioning the system, which provisioning includes the following sub steps:
      a) inputting, via the processor of the client device, a first set of credentials;
      b) Generating, via the processor of the client device, phantom credentials, wherein the phantom credentials are pseudo random regenerative credentials using the first set of credentials;
      c) Generating, via the processor of the client device, a first symmetric encryption key, embodied as a random string, from the phantom credentials, such that the first symmetric encryption key is regenerative;
      d) Inputting, via the input device of the client device, a personal identification number (PIN);
      e) Encrypting the phantom credentials using the PIN to create a second symmetric encryption key;
      f) Storing, via the processor of the client device, the encrypted phantom credentials on the client external storage device;
      g) Inputting, via the input device of the client device, user secret data;
      h) Initiating, via the processor of the client device, the encryption engine to use the first symmetric encryption key to encrypt the secret data from the client device and send the encrypted secret data to the server memory;
      i) Storing, via the processor of the server, the encrypted secret data on the server database;
   2. Utilizing the system, which utilizing includes the following sub steps:
      j) Inputting, via the input device of the client device, the PIN;
      k) Retrieving, via the processor of the client device, the encrypted phantom credentials from the client external storage device into the client device;
      l) Decrypting, via the processor of the client device, the phantom credentials using the PIN to create the second symmetric decryption key;

m) Generating, via the processor of the client device, the first symmetric encryption key from the phantom credentials;
n) Sending, via the processor of the client device, a request to the server for an elliptic public key;
o) Generating, via the processor of the client device, a fake client elliptic private key embodied as a random string;
p) Generating via the processor of the client device, a fake client elliptic public key from the fake client elliptic private key;
q) Sending, via the processor of the server, a server temporary elliptic public key to the client device processor;
r) Generating, via the processor of the client device, a third symmetrical encryption key on the client device from the fake client elliptic private key and server temporary elliptic public key;
s) Encrypting, via the processor of the client device, the first symmetric encryption key using the third symmetric encryption key and sending the encrypted first symmetric encryption key and the fake client elliptic public key to the server memory;
t) Extracting, via the processor of the server, the encrypted secret data from the server database and sending the encrypted first symmetric encryption key and the fake client elliptic public key from the client device memory to the server memory;
u) Generating, via the processor of the server, a fourth symmetric encryption key using the server temporary elliptic private key and the fake client elliptic public key;
v) Decrypting, via the processor of the server, the encrypted first symmetric encryption key using the fourth symmetric encryption key as a decryption key, thereby recovering the first symmetric encryption key;
w) Decrypting, via the processor of the server, the encrypted secret data stored on the server database using the first symmetric encryption key as a decryption key; and
x) Performing, via the processor of the server, work using the decrypted secret data.

2. The system of claim 1, wherein the external storage device is taken from a group consisting of a USB drive or similar memory dongle, smart card, near field communication (NFC) device, an Internet of Things device or an external trusted cloud database.

3. The system of claim 1, wherein the phantom username and phantom password of Step 1b are pseudo random strings formed from the username and password and cannot be reversed to retrieve the original credentials.

4. The system of claim 1, wherein the credentials stored on the external device in Step 2l are protected with a PIN, which PIN may be used as an encryption key to encrypt the credentials.

5. The system of claim 1, wherein the first symmetric encryption key is a 32 byte pseudo random string generated from the first set of credentials.

6. The system of claim 1, wherein client specific encrypted secret data is stored on the server and such encrypted secret data information can only be accessed with the permission of the client.

7. The system of claim 1, wherein the client can transfer a key to the server to access the data and perform the work associated with the decrypted secret data.

8. The system of claim 1, wherein the PIN and external storage device are given to a trusted Notary to authorize the server to perform work.

9. The system of claim 1, wherein the third and fourth symmetric encryption keys are formed from the product of an integer and an elliptic curve point.

\* \* \* \* \*